United States Patent

Wilson

[11] 3,859,364
[45] Jan. 7, 1975

[54] 1,1,3-TRIMETHYL-5-HYDROXYMETHYL-3-(4-HYDROXYMETHYL PHENYL)INDANE

[75] Inventor: John Charles Wilson, Rochester, N.Y.

[73] Assignee: Eastman Kodak Company, Rochester, N.Y.

[22] Filed: Apr. 3, 1973

[21] Appl. No.: 347,608

Related U.S. Application Data

[62] Division of Ser. No. 180,114, Sept. 13, 1971, abandoned.

[52] U.S. Cl. ............... 260/618 F, 96/87, 260/75 A, 260/75 R, 260/75 N, 260/75 UA, 260/77.5 AP, 260/77.5 AQ, 260/618 H
[51] Int. Cl. ........................ C07c 35/32, C08g 17/08
[58] Field of Search ................... 260/618 F, 619 F

[56] References Cited
UNITED STATES PATENTS
2,754,285  7/1956  Petropoulas .................... 260/619 F
2,979,534  4/1961  Petropoulas et al ............. 260/619 F OTHER PUBLICATIONS
Kitamagi et al., "Chem. Abstracts," Vol. 64, p. 8108C (1966).

Primary Examiner—Joseph E. Evans
Assistant Examiner—David B. Springer
Attorney, Agent, or Firm—A. H. Rosenstein

[57] ABSTRACT

A composition of matter comprising at least one compound selected from the group consisting of:

(A)

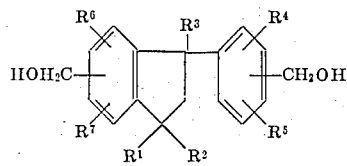

and (B)

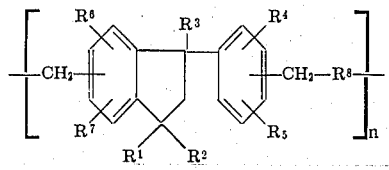

wherein $n$ is a positive integer;

$R^1$, $R^2$ and $R^3$ are methyl;

$R^4$, $R^5$, $R^6$ and $R^7$ are hydrogen;

$R^8$ is

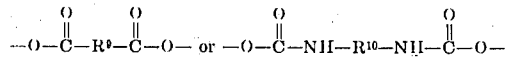

and $R^9$ and $R^{10}$ are aliphatic or aromatic.

1 Claim, No Drawings

1,1,3-TRIMETHYL-5-HYDROXYMETHYL-3-(4-HYDROXYMETHYL PHENYL)INDANE

This is a division of application Ser. No. 180,114, filed Sept. 13, 1971, now abandoned.

BACKGROUND OF THE INVENTION

1. Field of the Invention

This invention relates to hydroxymethyl-substituted phenylindans and polymers thereof and to the preparation of these condensants and polymers.

2. Description of the Prior Art

There is a continuing demand for low cost film-forming materials with improved physical properties which can be used as supports for photographic elements. Many of the currently available film-forming compositions that exhibit good physical characteristics are commercially unattractive owing to the cost of the component ingredients or the difficulty of the manufacturing conditions.

The compound 1,1,3-trimethyl-5-carboxy-3-(4-carboxyphenyl)indan is a commercially available material, generally referred to as phenylindan dicarboxylic acid or, abbreviated, PIDA. Means for the preparation of PIDA have been disclosed by Petropoulous in, for example, U.S. Pat. Nos. 2,780,609; 2,830,966 and 2,873,262. U.S. Pat. No. 2,780,609 describes the use of PIDA as a plasticizer for vinyl chloride polymers. U.S. Pat. No. 2,830,966 relates to polyester resin compositions comprising an unsaturated polyester resin and a polymerizible compound containing a vinylidene group, wherein the polyester resin is prepared by reacting a polyhydric alcohol with an alpha, beta-unsaturated polycarboxylic acid and PIDA. U.S. Pat. No. 2,873,262 relates to a process for preparing alkyd resins comprising reacting a polyhydric alcohol with PIDA.

The preparation of PIDA has also been described by Petropoulous et al., in U.S. Pat. No. 3,102,135.

Copolyesters of PIDA with terephthalic acid and ethylene glycol have been described in Belgian 731,258 and Netherlands 69,05547 and its reaction with bisphenols has been described by Hamb in Belgian 748,510.

Preparation and uses for 1-(hydroxyphenyl)indanols are described in U.S. Pat. Nos. 2,754,285, 2,819,249 and 2,979,534.

Diisocyanatoindans and diisothiocyanatoindans and polymers prepared therefrom are described in U.S. Pat Nos. 2,855,385 and 2,855,420.

SUMMARY OF THE INVENTION

The present invention comprises hydroxymethyl-substituted phenylindans and polyesters and polyurethanes prepared therefrom. More particularly, the present invention comprise a composition of matter comprising at least one compound selected from the group consisting of (A)

$$\text{HOH}_2\text{C}-\underset{R^7}{\overset{R^6}{\bigvee}}\underset{R^1\,R^2}{\overset{R^3}{\bigwedge}}\underset{R^5}{\overset{R^4}{\bigvee}}-\text{CH}_2\text{OH}$$

and (B)

$$\left[-\text{CH}_2-\underset{R^7}{\overset{R^6}{\bigvee}}\underset{R^1\,R^2}{\overset{R^3}{\bigwedge}}\underset{R^5}{\overset{R^4}{\bigvee}}-\text{CH}_2-R^8-\right]_n$$

wherein $n$ is a positive integer;

$R^1$, $R^2$ and $R^3$ are methyl and $R^4$, $R^5$, $R^6$ and $R^7$ are hydrogen.

$$-O-\overset{O}{\overset{\|}{C}}-R^9-\overset{O}{\overset{\|}{C}}-O-\text{ or }-O-\overset{O}{\overset{\|}{C}}-NH-R^{10}-NH-\overset{O}{\overset{\|}{C}}-O-$$

and $R^9$ and $R^{10}$ are aliphatic or aromatic.

The polymers are useful in the manufacture of fibers, lacquers, adhesives, molding resins, sheets, engineering plastics or subbing layers. In particular, these polymers are useful as photographic film supports.

DESCRIPTION OF THE PREFERRED EMBODIMENTS

As stated above, the novel condensants and polymers of this invention respectively have the following structures:

$$\text{HOH}_2\text{C}-\underset{R^7}{\overset{R^6}{\bigvee}}\underset{R^1\,R^2}{\overset{R^3}{\bigwedge}}\underset{R^5}{\overset{R^4}{\bigvee}}-\text{CH}_2\text{OH}$$

and $$\left[-\text{CH}_2-\underset{R^7}{\overset{R^6}{\bigvee}}\underset{R^1\,R^2}{\overset{R^3}{\bigwedge}}\underset{R^5}{\overset{R^4}{\bigvee}}-\text{CH}_2-R^8-\right]_n$$

As used here, $n$ is a positive integer and preferably has a value of at least about 15. $R^1$, $R^2$ and $R^3$ are methyl and $R^4$, $R^5$, $R^6$ and $R^7$ are hydrogen.

$$-O-\overset{O}{\overset{\|}{C}}-R^9-\overset{O}{\overset{\|}{C}}-O-\text{ or }-O-\overset{O}{\overset{\|}{C}}-NH-R^{10}-NH-\overset{O}{\overset{\|}{C}}-O-$$

wherein $R^9$ and $R^{10}$ are aliphatic or aromatic moieties. More specifically, $R^9$ and $R^{10}$ can be radicals selected from the group consisting of alkylene radicals of from 2 to 10 carbon atoms, such as ethylene, tetramethylene, pentamethylene, octamethylene, nonamethylene and the like; arylene radicals, such as o-, m-, or p-phenylene, naphthalenediyl, or anthracenediyl, unsubstituted or substituted with radicals such as halogen, nitro, cyano, alkyl of 1 to 6 carbon atoms or alkoxy of 1 to 6 carbon atoms; arylenebisalkylene radicals wherein the alkylene portion has 1 to 6 carbon atoms, such as phenylenedimethylene, phenylenediethylene, naphthalenediyldimethylene, naphthalenediyldiethylene and the like; cycloalkylene radicals, such as cyclopentylene, cyclohexylene, norbornanediyl; alkylenebisarylene radicals where the alkylene portion contains 1 to 12 carbon atoms, such as ethylene, trimethylene, hexamethylene, decamethylene, dodecamethylene, and the arylene portion is as defined above; alkylidenebisarylene radicals where the alkylidene portion contains 1 to 12 carbon atoms, such as ethylidene, allylidene, hexylidene and the like, and the arylene portion is as defined above; and aralkylene radicals where the arylene and alkylene portions are as defined above.

The radicals $R^9$ and $R^{10}$ can also be units having the formula:

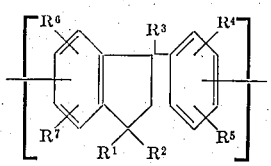

wherein $R^1$, $R^2$, $R^3$, $R^4$, $R^5$, $R^6$ and $R^7$ are as described above, or $R^9$ and $R^{10}$ can be presented by the formula:

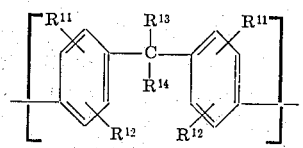

wherein each $R^{11}$ and $R^{12}$, which can be the same or different, are selected from the group consisting of hydrogen atoms, aryl radicals, such as phenyl, including substituted phenyl, halogen atoms, nitro radicals, cyano radicals, alkoxy radicals and the like, and wherein the substitutents on the phenyl radical may be a halogen atom, nitro radical, cyano radical, or alkoxy radical. $R^{13}$ and $R^{14}$ represent aliphatic monocyclic or bicyclic radicals or can each be hydrogen atoms, alkyl radicals of from 1 to 6 carbon atoms, including substituted alkyl radicals, such as fluoromethyl, difluoromethyl, trifluoromethyl, dichlorofluoromethyl, 2-[2,3,4,5-tetrahydro-2,2-dimethyl-4-oxofur-3-yl]ethyl and the like; cycloalkyl radicals of from 4 to 6 carbon atoms, such as cyclohexyl; and aromatic radicals having from 6 to 20 carbon atoms, such as phenyl, 3,4-dichlorophenyl, 2,4-dichlorophenyl. $R^{13}$ and $R^{14}$ taken together with the carbon atom to which they are attached can represent a monocyclic, polycyclic, or heterocyclic moiety having from 4 to 15 atoms in the ring system.

Dicarboxylic compounds which can be employed to advantage in preparing polyesters from the dihydroxymethyl compounds of this invention include succinic acid, glutaric acid, adipic acid, pimelic acid, azelaic acid, sebacic acid, 2-methyladipic acid, diglycolic acid, thiodiglycolic acid, fumaric acid, cyclohexane-1,3-dicarboxylic acid, cyclohexane-1,4-dicarboxylic acid, cyclopentane-1,3-dicarboxylic acid, 2,5-norbornanedicarboxylic acid, (the above-described acids being useful either as the cis or trans form), phthalic acid, isophthalic acid, terephthalic acid, t-butylisophthalic acid, phenylenediacetic acid, phenylenedipropionic acid, 2,6-naphthalenedicarboxylic acid, 1,4-naphthalenedicarboxylic acid, 1,5-naphthalenedicarboxylic acid, 1,7-naphthalenedicarboxylic acid, 4,4'-diphenic acid, 4,4'-sulfonyldibenzoic acid, 4,4'-oxydibenzoic acid, binaphthyldicarboxylic acid, 4,4'-stilbenedicarboxylic acid, and 9,10-triptycenedicarboxylic acid.

Although the dicarboxylic acids useful in the practice of this invention can be employed in the free acid form, it is often more advantageous to utilize a bifunctional derivative. For example, the corresponding acid anhydrides may be used where they are available. Other useful bifunctional equivalents include the lower monohydric alcohol or phenyl esters of dicarboxylic acids and the dicarboxylic acid halides, e.g., the chlorides or bromides.

The molecular weight of the linear condensation polymers of this invention can vary over wide ranges; it has been found that polymers having a molecular weight of at least about 10,000 are useful. Compounds having a molecular weight from about 30,000 to 100,000 are particularly desirable. The compounds of this invention are further characterized by their inherent viscosities. Generally, the subject film-forming polymers have an inherent viscosity of about 0.1 to about 0.8 and the polymers preferred as supports for photographic elements have an inherent viscosity of about 0.5 to about 0.8. The inherent viscosities are measured at 25°C in 1:1 (by wt.) phenol: chlorobenzene at a concentration of 0.25g of polymer per 100 ml. of solution unless otherwise specified.

The glass transition temperatures of the polymers of this invention can be determined by differential scanning calorimetry as disclosed in "The DSC Cell and Accessories Instruction Manual for the 900 Thermal Analyzer and Modules," sold by E. I. DuPont deNemours Instrument Products Division.

"Film-forming" as used in this invention refers to a material which will provide a self-supporting film of the material when cast or extruded, for example, when cast in sheets of from 1 to 7 mils thickness.

It is appreciated, of course, that the physical properties of the broad class of polymers of this invention, such as, for example, the glass transition temperature (Tg), yield strength, break strength, Young's modulus and the like, can be varied over a wide range. Polymers with properties in a particular range can be easily obtained by judicious selection of appropriate diol and dicarboxylic components and suitable mixtures thereof. The proper choice and proportions of the monomeric components can be determined by test procedures well-known to those skilled in the art of making condensation polymers.

As indicated in the general formula set out hereinabove, the linear condensation polymers of this invention include polyesters, polyurethanes and mixed polyester-polyurethanes. Generally, any procedure known in the art for making linear condensation polymers can be used in preparing the polymers of this invention. The following are examples of processes that may be utilized to produce the liner polymers of this invention.

a. The interfacial procedure can be utilized to make the polymers by converting the diol to the bischloroformate. The preferred time of reaction is a function of all other variables and, as such, is governed by the viscosity desired for the polymer. Generally, the reaction can be monitored by sampling and thus the preferred polymerization time chosen. A variety of solvents may be employed to provide a broad range of temperatures and solubilities as desired. Suitable solvents include the chlorinated hydrocarbons such as, for example, chloroform, dichloroethane, propylene dichloride, dichlorobenzene and the like.

b. Polymers, according to this invention, can be prepared by a solution procedure whereby the reactants are placed in solution in the presence of an acid acceptor, e.g., a Lewis base such as, for example, pyridine. The Lewis base can also be present in excess and thus serve also as the solvent.

c. The ester interchange procedure of synthesizing polymeric esters both by the melt process and the powder process can advantageously be used to make the polyesters of this invention, in particular, the powder process can be used advantageously when the first stage polymers can be crystallized. In a preferred embodiment, these techniques may be used in combination with a solvent crystallization step to afford film-forming polyesters having improved physical properties. The solvent crystallization procedure generally involves contacting melt process polymer with a solvent at embient temperatures. Suitable solvents include acetone, 2-pentanone, ethyl acetate, acetic acid, toluene and the like. The treated material is separated from the solvent by any conventional procedure and put through the powder process. The melt process is advantageously conducted in the presence of a catalytic agent. Useful catalysts for the transesterification reactions include the carbonate, oxide, hydroxide, hydride and alkoxide of an alkali metal or an alkaline earth metal, a compound of a Group IVA metal of the Periodic Table, e.g., titanium isopropoxide, organometallic halides and complex alkoxides such as $NaHTi(OC_4H_9)_2$ and the like.

The film-forming materials of this invention can be generally extruded or cast into flexible supports and used in various layer arrangements and structural combinations. Generally, the flexible supports prepared from the polymers of this invention are treated by any convenient method to improve the adhesion of superimposed coatings or layers. Useful procedures include subbing with conventional subbing agents for polymer supports, contacting with a chemical agent such as sulfuric acid, electron bombardment, and the like. The film-forming polymers of this invention are used to advantage as flexible supports for photographic silver halide and other light-sensitive systems as well as for multi-layer elements used in color photography and diffusion transfer processes.

The following examples are included for a further understanding of the invention. It should be understood that where equations are given, they represent the overall reaction described in the particular example without regard to possible mechanism.

EXAMPLE I

Synthesis of 1,1,3-Trimethyl-5-hydroxymethyl-3-(4-hydroxymethylphenyl)indan from 1,1,3-Trimethyl-5-carboxy-3-(4-carboxyphenyl)indan and Lithium Aluminum Hydride To a mixture of 18.2g (0.48 mole) of lithium aluminum hydride in 200 ml of dry tetrahydrofuran under nitrogen was added a solution of 32.44g (0.10 mole) of 1,1,3-trimethyl-5-carboxy-3-(4-carboxyphenyl)indan in 400 ml of dry tetrahydrofuran over a 30 minute period maintaining a reaction temperature of 51°–55°C. The mixture was stirred for an additional hour whereupon 200 ml of methanol were slowly added. The mixture was then poured into ice cold dilute sulfuric acid and filtered. The damp solid was dissolved in 150 ml of ethanol and filtered. To the hot filtrate was added 175 ml of water. On cooling, an oil formed which crystallized. This solid was collected and dried to give 21.0g of material; mp = 108°–113°C. A portion of this material (8.4g) was recrystallized again from 500 ml of 1:1 ligroin:benzene solution giving 5.7g of material; mp = 108°–111°C. IR and NMR data were consistent with the proposed structure.

Analysis calculated for $C_{20}H_{24}O_2$: C, 81.04; H, 8.16; M. Wt., 296.4g. Found: C, 80.7; H, 8.5; M. Wt., 299g.

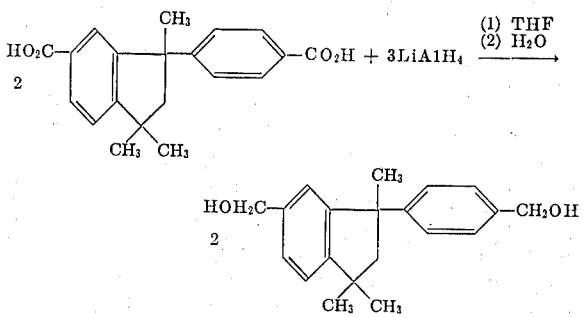

EXAMPLE II

Synthesis of 1,1,3-Trimethyl-5-hydroxymethyl-3-(4-hydroxymethylphenyl)indan from 1,1,3-Trimethyl-5-carbomethoxy-3-(4-carbomethoxyphenyl)indan and Sodium bis (2-methoxyethoxy)-aluminum Hydride To 510 ml (1.36 moles) of a 54 percent refluxing solution of sodium bis (2-methoxyethoxy)aluminum hydride in benzene was added a solution of 240g (0.68 mole) of 1,1,3-trimethyl-5-carbomethoxy-3-(4-carbomethoxyphenyl)indan in 800 ml of benzene over a 1.17 hour period. Reflux was maintained for an additional 2 hours followed by cooling. To the cooled solution was added 250 ml of water over a 20 minute period, followed by 5 minutes of additional stirring. The mixture was filtered, the water layer separated from the filtrate and the organic layer dried over sodium sulfate. This was followed by filtration and concentration of the filtrate. The residue was then treated with 1000 ml of refluxing 10 percent sodium hydroxide solution for 2 hours, cooled and isolated as a grease. This grease gave crystals when slurried in ether which were collected, washed with water and dried. This material (49.5g) was recrystallized from 500 ml of benzene giving 37.3g of material; mp = 118.5°–119.5°C. IR and NMR data agreed with the proposed structure.

Analysis Calculated for $C_{20}H_{24}O_2$: C, 81.04; H, 8.16; M. Wt. 296.4g. Found: C, 80.8; H, 8.3; M. Wt., 296g.

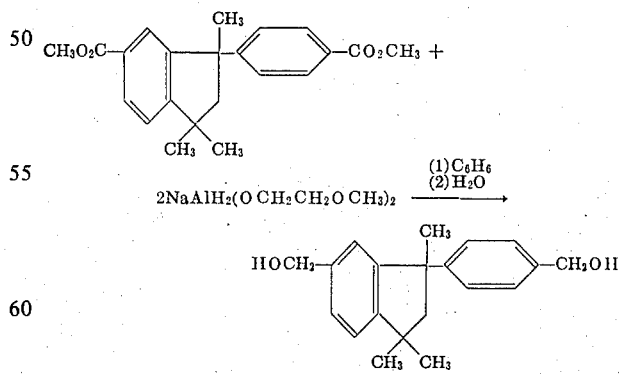

EXAMPLE III

Polymerization of 1,1,3-Trimethyl-5-hydroxymethyl-3-(4-hydroxymethylphenyl)indan and Terephthaloyl Chloride A solution of 4.06g (0.02 mole) of terephthaloyl chloride and 5.93g (0.02 mole) of 1,1,3-trimethyl-5-hydroxymethyl-3-(4-hydroxymethylphenyl)indan in 50 ml of dry pyridine was heated at reflux for two hours. The solution was then precipitated in 1500 ml of methanol and the polymer was collected and dried.

The inherent viscosity of the polymer was measured in a 1:1 (wt.) phenol:chlorobenzene solution at a concentration of 0.25g/100 ml. solution at 25°C and found to be 0.18. The glass transition temperature was determined by means of a DuPont 900 Differential Scanning Colorimeter at 10°C per minute in nitrogen and found to be 136°C.

EXAMPLE V

Polymerization of 1,1,3-Trimethyl-5-hydroxymethyl-3-(4-hydroxymethylphenyl)indan and Methylenedi-p-phenyl Diisocyanate A solution of 6.26g (0.025 mole) of methylenedi-p-phenyl diisocyanate and 7.41g (0.025 mole) of 1,1,3-trimethyl-5-dichlorobenzene was heated at 75°–90°C for 1 hour with a catalytic amount of dibutyltin oxide. The polymer precipitated at this time, and the mixture was poured into 1500 ml of methanol. The polymer was collected and dried.

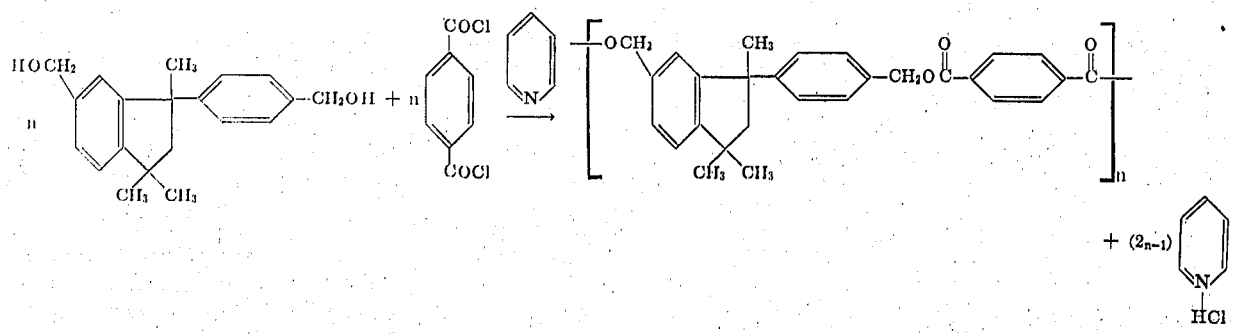

$n$ is a positive integer.

EXAMPLE IV

The inherent viscosity of the polymer, determined as in Example III, was 0.55 and the glass transition temperature was 114°C.

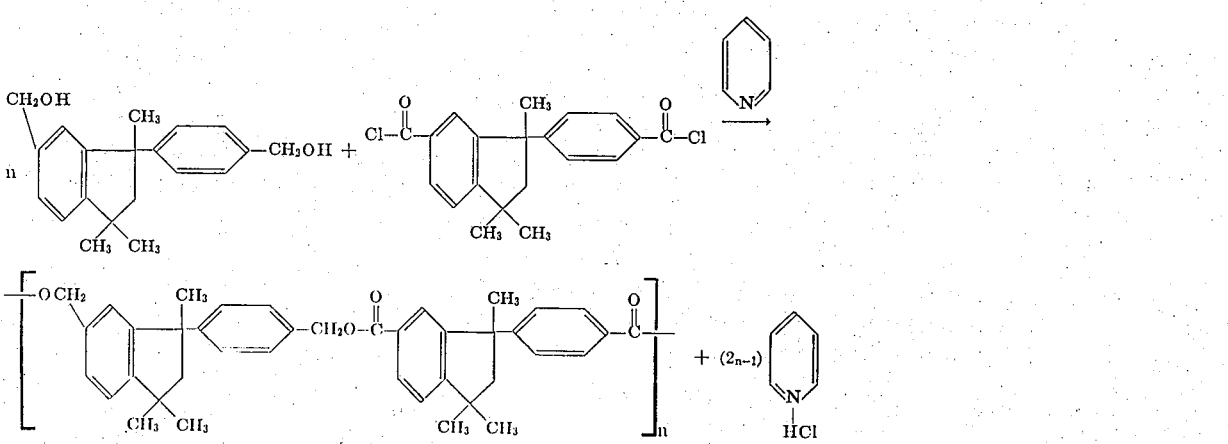

Example III was repeated except that 1,1,3-trimethyl-5-carboxy-3-(4-carboxyphenyl)indan dichloride was substituted on an equimolar basis for the terephthaloyl chloride employed therein. The inherent viscosity of the polymer was 0.18 and the glass transition temperature was 181°C.

$n$ is a positive integer.

EXAMPLE VI

Example V was repeated except that hexamethylene diisocyanate was substituted on an equimolar basis for $n$ is a positive integer.

the methylenedi-p-phenyl diisocyanate employed therein. The inherent viscosity was found to be 0.28 and the glass transition temperature was 21°C.

EXAMPLE VII

Example V was repeated except that tolylene-2,4-diisocyanate was substituted on an equimolar basis for the methylenedi-p-phenyl diisocyanate employed therein. The inherent viscosity was found to be 0.18 and the glass transition temperature was 135°C.

EXAMPLE VIII

Preparation of a Polyurethane Film by Solvent-casting.

A sample of polymer from Example V was dissolved in tetrahydrofuran, filtered and coated on a Teflon spray-coated glass plate. After drying, a self-supporting colorless film was formed.

EXAMPLE IX

A strip of film from Example VIII was treated with an activated gas by the process of Example IV of Belgian Pat. No. 736,993 for about 5 seconds using nitrogen trioxide as both the activator and reactive gases. The strip was then coated with a conventional gelatin silver halide emulsion. The coating, after drying, had fair adhesion.

Generally, the film-forming materials of this invention can be solvent-cast or melt-extruded into sheets or films as useful flexible supports which can be utilized in various layer arrangements and structural combinations. Generally, the flexible supports of this invention are treated by any convenient method to improve the adhesion of superimposed coatings or layers. Useful procedures include sub-coating with either aqueous subbing systems, such as latexes or with organic subbing systems comprising solvent-soluble polymers in aqueous or organic solvents or in solvent mixtures, contacting with a chemical agent, such as sulfuric acid, electron bombardment and the like.

Films prepared from the linear condensation polymers of this invention are useful as flexible supports for photographic silver halide emulsions and other light-sensitive systems that do not contain halides. Polymeric films, according to this invention, are also desirable as supports for multilayer elements used in color photography and in diffusion transfer processes.

Film supports prepared from polymers of this invention are compatible with a wide variety of materials employed as binding agents in photographic silver halide emulsions. Useful binding agents include gelatin, synthetic polymeric compounds, such as dispersed vinyl compounds, such as in latex form and mixtures of gelatin and other synthetic polymeric compounds. The polymers of this invention find further use as supports for light-sensitive colloid layers such as are used in image transfer processes, in lithography, and the like. The dimensional stability of the subject polymers make them suitable as supports for photoresists such as those utilized in the preparation of printed circuits, and the like.

Polymeric compositions, according to this invention, are advantageously prepared by standard techniques using well-known industrial processes. The compounds employed in making the polymers of this invention are prepared from readily available, inexpensive materials. A further advantage of the polymers of this invention is that they may be readily formed into film using procedures consistent with commercially available equipment.

The invention has been described in detail with particular reference to preferred embodiments thereof, but it will be understood that variations and modifications can be effected within the spirit and scope of the invention.

What is claimed is:

1. A compound having the formula

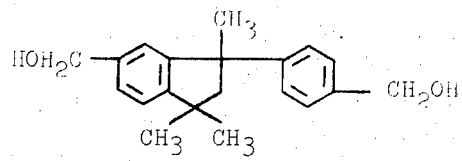

* * * * *

UNITED STATES PATENT AND TRADEMARK OFFICE
CERTIFICATE OF CORRECTION

PATENT NO. : 3,859,364
DATED : January 7, 1975
INVENTOR(S) : John C. Wilson

It is certified that error appears in the above-identified patent and that said Letters Patent are hereby corrected as shown below:

Column 1, line 57, "comprise" should read --comprises--.

Column 2, line 13, before the formula appearing on lines 14 and 15, insert --$R^8$ is--; line 46, before the formula appearing on lines 47-49 insert --$R^8$ is--.

Column 5, line 12, "embient" should read --ambient--.

Signed and Sealed this twenty-seventh Day of April 1976

[SEAL]

Attest:

RUTH C. MASON
*Attesting Officer*

C. MARSHALL DANN
*Commissioner of Patents and Trademarks*